May 18, 1926.

F. B. PEEBLES

CONVEYER SYSTEM

Filed June 18, 1923      2 Sheets-Sheet 1

1,584,889

Inventor.
Frank B. Peebles,
by Roberts, Roberts & Cushman
Att'ys.

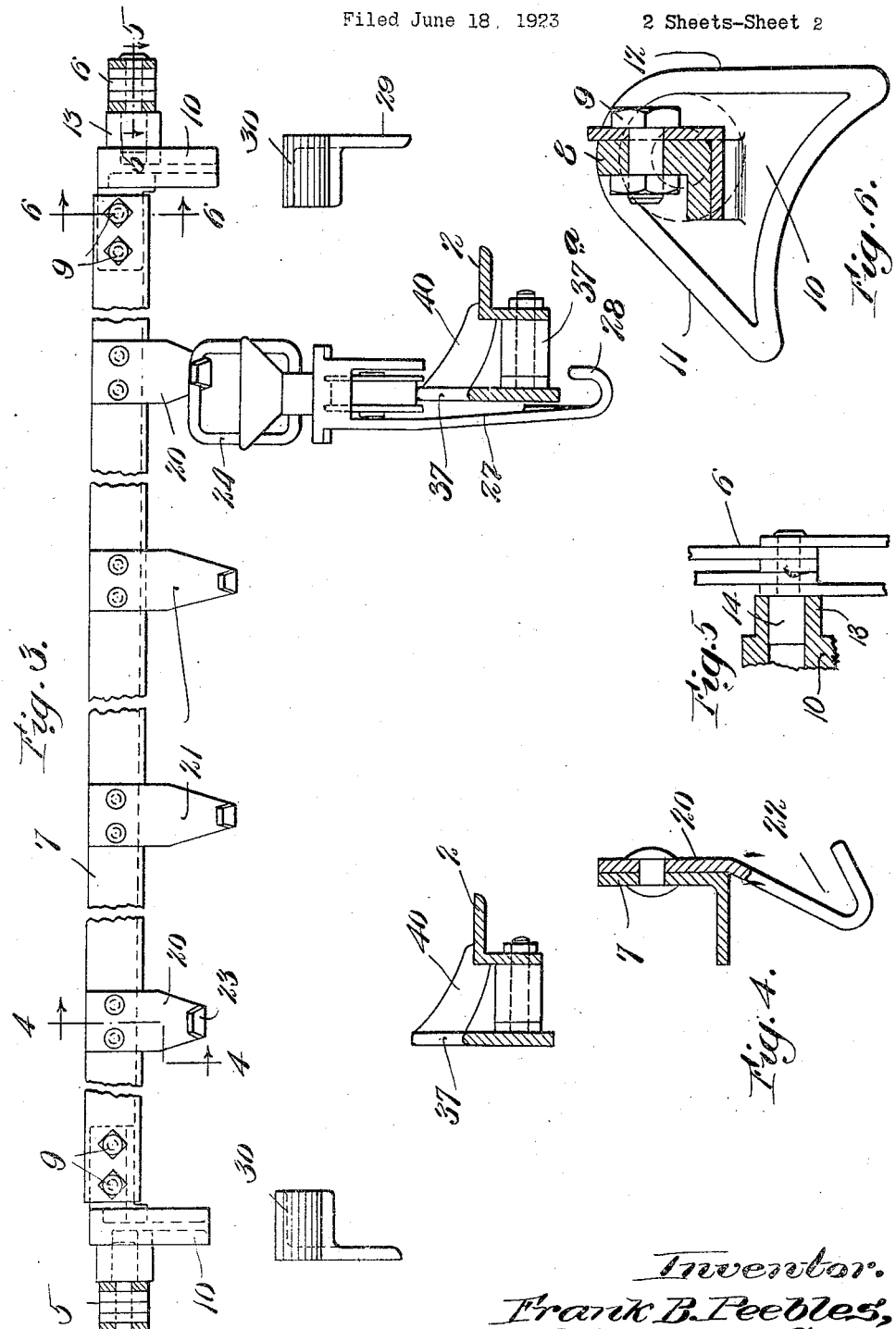

Patented May 18, 1926.

1,584,889

UNITED STATES PATENT OFFICE.

FRANK B. PEEBLES, OF SYRACUSE, NEW YORK, ASSIGNOR TO THE LAMSON COMPANY, OF SYRACUSE, NEW YORK, A CORPORATION OF MASSACHUSETTS.

CONVEYER SYSTEM.

Application filed June 18, 1923. Serial No. 646,013.

This invention pertains to conveyer system of that type in which the articles to be transported are lifted to a proper height by means of an endless chain and then are automatically released from the chain and deposited upon a more or less horizontal track or rail running to the desired destination and relates more particularly to the means for automatically transferring the articles from the elevating chain to the rail.

When such a system is employed for transporting articles which are not usually packed in boxes or barrels, such for example as sacks of grain, bunches of bananas, etc., it is common to employ wheeled carriers or trolleys having hooks or other means for holding the articles during transportation and provided with elements by means of which they may be attached temporarily to the elevating chain and lifted with their loads to the level of the tracks or rails.

When the trolley with its suspended load arrives at the level of the track it must automatically be disengaged from the chain and deposited upon the track without interference with or damage to or dropping of the load.

The principal object of the present invention is to provide improved and preferably adjustable devices for disengaging the trolleys from the elevating chain without danger of their accidental reengagement therewith and without disturbing their loads, and also for accurately engaging the wheels of the trolleys with the conveyer tracks or rails.

In the accompanying drawings, in which one preferred embodiment of the invention is disclosed;

Fig. 3 is a transverse section to larger scale on the line 3—3 of Fig. 1.

Fig. 4 is a vertical section to larger scale on the line 4—4 of Fig. 3.

Fig. 5 is a fragmentary horizontal section on the line 5—5 of Fig. 3, and

Fig. 6 is a vertical section to larger scale on the line 6—6 of Fig. 3.

Figure 1:
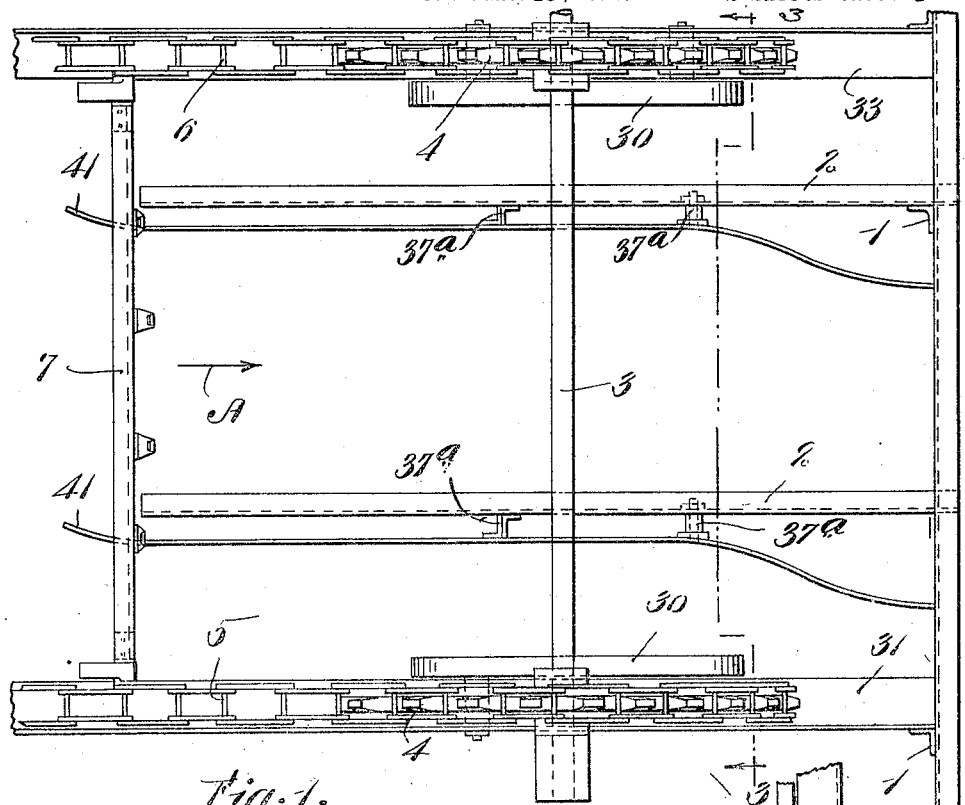
Fig. 1 is a fragmentary plan view of that portion of the conveyer system at which the articles being transported are transferred from the elevator chain to the conveyer tracks.

Referring to the drawings, the numeral 1 indicates vertical members or supports of a frame work upon which the operative elements of the conveyer are mounted, while the numeral 2 designates certain substantially horizontal members of such frame work.

A shaft 3 is journaled to turn in suitable bearings carried by the supporting frame work and this shaft is provided, near its opposite ends, with sprocket wheels indicated at 4. These sprocket wheels serve to separate and guide an endless elevator chain consisting of the spaced link-chains 5 and 6 and the transverse connecting bars 7, one only of which is shown.

The bars 7 are preferably formed of angle iron and to each end of each bar a bracket 8 (Fig. 6) is secured by means of bolts 9. A dog 10 is secured to each of the brackets 8, preferably being integral therewith. These dogs are substantially alike and are provided with symmetrically disposed cam surfaces 11 and 12 respectively.

Sleeve-like bosses 13 project from the outer faces of the dogs 10, being designed to receive pivot pins 14 carried by links of the chains 5 and 6. The pins 14 thus connect the transverse bars 7 to the chains 5 and 6 and constitute pivots about which the bars 7 may turn. In the construction described it is possible to remove the bars 7 by springing the chains 5 and 6 away from each other so as to permit withdrawal of the pins 14 from the sleeves 13, although such capability of disengagement forms no essential feature of the present invention.

Each of the bars 7 is provided with one or more spaced hooks 20. Preferably each bar is provided with two such hooks arranged respectively near its opposite ends. Other hooks such as 21 may also be secured to the bar 7 intermediate the hooks 20 if desired.

The hooks 20 are so disposed that their throats or openings 22 are presented forwardly in the direction of movement of the elevator chain. These hooks are conveniently formed of flat bar material and are of substantial width transversely of their direction of travel as indicated at 23.

These wide hooks are particularly intended for engagement with the pivoted bails 24 of article supporting trolleys 25. These bails occupy a substantially vertical position when engaged by the hooks 20 but when disengaged fall freely to a substantially horizontal position. Each trolley 25 comprises a frame in which a grooved trolley wheel 26 is journaled, and a depending arm 27 which terminates in a hook 28. Preferably the parts are so arranged that the bend of the hook lies substantially in the vertical plane of the trolley wheel.

At either side of the elevator chain a releasing cam 30 is arranged. These cams 30 lie substantially in the vertical planes respectively of the dogs 10 carried by the bars 7 and are supported upon brackets 31 and 32 mounted upon guard rails 33 which extend just below the chains 5 and 6 respectively. These releasing cams 30 are preferably formed from angle iron and are of substantial length in the direction of movement of the elevator chain. Preferably the ends of the cam members 30 are bent or curved downwardly as shown in Fig. 2.

In accordance with the preferred arrangement the brackets 31 and 32 are provided with vertical slots 34 to permit of their vertical adjustment with respect to the rails 33 while the cam members 30 are provided with horizontal slots 35 permitting their horizontal adjustment relatively to their supporting brackets.

Figure 2:
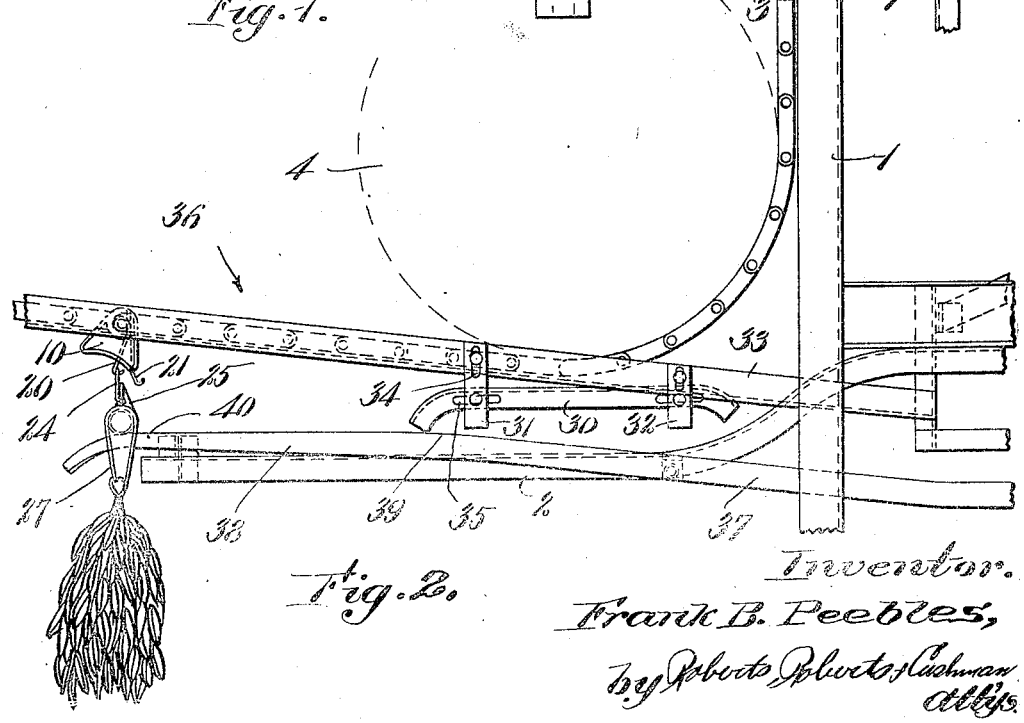
Fig. 2 is a fragmentary side elevation, partly diagrammatic and to somewhat larger scale than Fig. 1, showing certain of the elements illustrated in the last named figure.

The elevator chain extends as shown in Fig. 2 in a downwardly inclined run at 36 just before it passes upwardly about the sprocket wheels 4.

A pair of receiving rails 37 are disposed beneath the inclined run 36 of the elevator chain and extend substantially parallel respectively to the paths of movement of the hooks 20. These rails are secured to the frame members 2 by means of spacer brackets 37ª (Fig. 3) and are provided with free terminal portions 38 extending oppositely to the direction of movement of the elevator chain.

The terminal portions 38 of the tracks or rails 37 are substantially horizontal so that the run 36 of the elevator chain gradually converges toward the horizontal plane of the portions 38 of the rails. At the point 39, the rails 37 begin to incline so that they diverge from the chain which near this point begins to move upwardly about the sprocket wheels. The point 39 at which the rails begin to incline downwardly is substantially below that end of the cam member 30 at which dog 10 first has contact therewith.

The rails 37 are preferably disposed in vertical planes slightly to the left (Figs. 1 and 3) of the vertical planes of movement of the centers of the respective hooks. The extremities 40 of the rails 37 are deflected to the right as viewed in Fig. 3 and gradually taper in height.

The operation of the device above described is substantially as follows, it being assumed that the elevator chain is moving in the direction of the arrow A and that an article supporting trolley 25 carrying a bunch of bananas B is hung suspended from one of the hooks 20.

As the chain advances, the tapering extremity 40 of one of the rails 37 enters between the trolley wheel 26 and the hook 28. If the bail 24 of the trolley should be positioned to the extreme right in the supporting hook 20, the engagement of the curved extremity of the rail will crowd the trolley slightly to the left as viewed in Fig. 3 so that the plane of the groove of the trolley wheel will assuredly be brought into coincidence with that of that rail.

As the chain advances the hook 20 gradually approaches the upper surface of the rail until at the point 39 the entire weight of the trolley and its load is carried by the rail. At this point the surface of the dog 10 engages the releasing cam member 30 which causes the dog 10 to swing in a clockwise direction, thereby turning the bar 7 and tipping the hook 20 until it releases the bail 24. The latter tends to drop immediately to a horizontal position and, as the cam 30 is of considerable length, the hook 20 is positively prevented from reengaging the bail.

As soon as the trolley is released it begins to move down the inclined portion of the rail 37, thus carrying it rapidly away from the hook 20 so that by the time the latter is released by the cam 30, the trolley bail is out of reach. The trolley now continues down the rail 37 to its point of destination, being propelled by gravity or any suitable mechanical device, not shown.

If, in approaching the end 40 of the rail 37, the trolley bail 24 should be at the extreme limit to the left in the hook 20, it may not contact with the curved extremity of the rail but by reason of the placing of the rail somewhat to the left of the vertical plane of the center line of the hook the proper engagement of the trolley wheel with the rail is nevertheless assured. Such engagement is also made more certain by the fact that the weight of the article supported upon the hook 28 tends to swing the trolley into engagement with the left side of the rail.

While a preferred form of the device is herein illustrated, it is contemplated that various changes, both in form and proportion of parts, may well be made in accordance with the circumstances of the particular situation in which the device is installed without departing from the spirit of the present invention.

I claim:

1. A conveyer system comprising a flexible conveyer moving in a path including a downwardly inclined run followed by an upwardly inclined run, a forwardly open hook carried by and secured to the conveyer, and a fixed track substantially parallel to and below the path of movement of the hook, said track comprising a substantially horizontal section followed by a downwardly inclined section, the point of intersection of said track sections being disposed below the downwardly inclined portion of the path of the hook.

2. A conveyer system comprising a flexible conveyer moving in a path including a downwardly inclined run followed by an upwardly inclined run, a forwardly open hook rotatably supported upon the conveyer, a fixed track substantially parallel to and below the path of movement of the hook, said track comprising a substantially horizontal section followed by a downwardly inclined section, the point of intersection of said track sections being disposed below the downwardly inclined portion of the path of the hook, and means for rotating the hook to release an article carried thereby substantially as the hook passes such point of intersection of the track sections.

3. A conveyer system comprising a flexible conveyer consisting of spaced parallel chains connected at intervals by bars, forwardly directed trolley supporting hooks mounted upon the respective bars intermediate the chains, means for guiding the chains to cause said bars to move in a downwardly inclined path merging into an upwardly directed path, means for releasing the trolley from the trolley supporting hook at a point adjacent to said downwardly inclined path, and a rail disposed in a vertical plane slightly to one side of the vertical plane of movement of the center of the hooks and having a portion so disposed with respect to said downwardly inclined path as to engage the trolley and sustain a substantial part of the weight of the latter before it is released from its supporting hook.

4. A conveyer system having an endless chain comprising a rotary hook carrying member provided with an actuating dog having an eccentric contact element, a hook carried by said member, and a relatively fixed cam member having a substantially rectilinear active surface converging toward the path of the chain, said cam member being positioned to engage the eccentric contact element of the dog whereby positively to turn said hook carrying member and thereby tip its hook to disengage an article supported thereby, the active surface of the cam being of substantial length so as to retain the hook in article disengaging position for an appreciable period of time whereby to insure release of the article.

5. A conveyer system having an endless chain comprising a rotary hook carrying bar provided with an eccentric actuating dog, at each end, a plurality of hooks fixed to the bar at spaced intervals, and cam members having elongate substantially straight active surfaces converging toward the path of the chain, said cam members being constructed and arranged respectively to engage the dogs of the hook carrying bar whereby to cause the bar to turn and to dwell in turned position for a predetermined interval.

6. A conveyer system having an endless chain conveyer comprising a rotary hook supporting bar movable relatively to the chain, said bar supporting a plurality of forwardly directed hooks and rotating relatively to the chain to disengage articles suspended from said hooks, normally fixed cams, means supporting said cams for adjustment longitudinally of the conveyer, wiper members carried by the hook supporting bar and engageable respectively with said cams whereby to turn the bar, and rails arranged to receive the articles and to support the latter when they are released from the hooks.

7. A conveyer system having an endless chain conveyer comprising a rotary hook supporting member, a normally fixed cam provided with spaced elongate slots, bracket members, pins passing through the slots in the cam adjustably to connect the latter to the bracket members, said bracket members having elongate slots disposed substantially at right angles to the slots in the cam, pins passing through the slots in the brackets adjustably to connect them to a fixed support, a wiper member fixed to the hook supporting member and engageable with said cam as the conveyer moves to cause said hook supporting member to turn relatively to the chain and thereby to release an article supported by its hook, and a rail arranged in position to receive the article when released from the hook.

8. A conveyer system having an elevator chain provided with a hook supporting member forming a part of the chain, a hook secured thereon, the open side of the hook normally facing in the direction of its movement with the chain, and a receiving rail extending substantially parallel to and slightly to one side of the vertical plane of movement of the central point of the hook.

9. A conveyer system having an endless chain comprising a hook supporting member forming a permanent element of the chain structure, a hook having a bend of substantial width fixedly secured to said member, and a receiving rail disposed below a run of the chain and extending substantially parallel to the path of movement of the hook, said rail being disposed in a vertical plane slightly to one side of the vertical plane of the center of the hook.

10. A conveyer system having an endless chain comprising a hook supporting member forming a permanent part of the chain structure, a flat article supporting hook carried by said member, the flat side of the hook facing in the direction of its movement, and a receiving rail disposed below a run of the chain and in a vertical plane nearer to the vertical plane of one edge of the hook than to the vertical plane of the other edge of the hook.

11. A conveyer system having an endless chain comprising a hook supporting member, an article supporting hook carried by the latter, and a receiving rail disposed below the chain and extending substantially parallel to the path of the hook, that end of the rail directed oppositely to the movement of the hook being laterally deflected.

12. A conveyer system having an endless chain comprising a hook supporting member forming a permanent part of the chain, a hook fixed to said member, and a receiving rail disposed below a run of the chain and extending substantially parallel to the path of the hook, that end of the rail directed oppositely to the movement of the hook being directed downwardly and laterally.

13. A conveyer system having an endless chain comprising a transverse bar forming a permanent part of the chain, a hook fixed to said bar, and a receiving rail disposed below a run of the chain and extending substantially parallel to the path of movement of the hook, that end of the rail directed oppositely to the movement of the hook being bent laterally and downwardly toward its extremity.

14. A conveyer system having an endless chain comprising transversely extending bars, a pair of spaced hooks carried by one at least of said bars, and receiving rails disposed below a run of the chain, one of said rails extending substantially parallel to the path of movement of each hook, the ends of said rails which are directed toward approaching hooks being deflected laterally in the same direction.

15. A conveyer system having an endless chain comprising a plurality of transversely extending bars, hooks carried by the bars, the hooks forming a plurality of series extending longitudinally of the chain and arranged to support article carrying trolleys, and trolley receiving rails extending substantially parallel to the paths of the several series of hooks, the ends of the several rails which are directed toward the approaching hooks being laterally and downwardly deflected to ensure proper engagement therewith of trolleys carried by the hooks.

Signed by me at Syracuse, N. Y., this eleventh day of June, 1923.

FRANK B. PEEBLES.